Dec. 31, 1968    F. DOVE    3,418,851
TAKE-OFF DIRECTORS
Filed Nov. 1, 1966

INVENTOR
FRANK DOVE
BY
*S.C.Yeaton*
ATTORNEY

United States Patent Office 3,418,851
Patented Dec. 31, 1968

3,418,851
TAKE-OFF DIRECTORS
Frank Dove, St. Albans, England, assignor to Sperry Rand Limited, London, England, a company of England
Filed Nov. 1, 1966, Ser. No. 591,329
Claims priority, application Great Britain, Dec. 15, 1965, 53,238/65
7 Claims. (Cl. 73—178)

ABSTRACT OF THE DISCLOSURE

Apparatus for controlling the flight path of an aircraft during take-off utilizing an attitude command signal produced from data representative of aircraft longitudinal acceleration, pitch attitude and airspeed wherein a differentiator circuit including a capacitor, resistor and unidirectional current conductive element operates in conjunction with capacitor charging circuits to modify the airspeed data, the signal at the output of the differentiator being determined by the airspeed data when airspeed increases at a normal rate and by the charging circuits when airspeed increases at less than the normal rate thereby effecting predetermined airspeed requirements within given time intervals.

---

This invention relates to aircraft flight directors (i.e. instruments which give a pilot commands relating to the aircraft pitch attitude angle which, if followed, will ensure that the aircraft is held to appropriate incidence angles with regard to the operating conditions), and to computers for automatic pilots, which compute commands relating to the attitude for use by the automatic pilot. Examples of such flight directors are described and claimed in my co-pending patent application Ser. No. 456,223 now Patent No. 3,371,528, and British application No. 37,645/65. In these flight directors and computers a number of different measured flight parameters are made available to be used to produce the commands, one of the parameters being the actual airspeed of the aircraft. During take-off, the airspeed is of major importance, since stalls are a grave danger, and in prior instruments an airspeed-derived signal has been applied to monitor a command signal produced from other parameters to reduce the commanded pitch attitude in the event of loss of speed during take-off, so as to tend to maintain the speed.

In one such arrangement, during the ground run the signal from an airspeed sensor is applied to the director to show error from the predetermined airspeed at which the aircraft pitch attitude should be increased, so leading to the aircraft becoming airborne. Thereafter an electromechanical servo unit operates mechanically to reduce the airspeed signal to zero while the airspeed is increasing, so that no airspeed signal is applied to the director. The servo unit can however only operate in one sense so that on reduction of airspeed a signal representing reduction below the maximum speed attained is applied to the director.

This invention is concerned with improving the processing of the airspeed-derived signal for use in monitoring a command signal and in particular with avoiding the use of the cumbersome electromechanical servo unit.

The invention provides apparatus for producing an aircraft take-off attitude command signal, including an electrical circuit having means for receiving an electrical airspeed-representing signal, said circuit being adapted to differentiate received signals related to increasing airspeed, and to produce on an output line an output signal related to airspeed error in response to received signals related to decreasing airspeed, and means for applying signals in said output line to influence the attitude command signal, said airspeed error signals being such as to cause a reduced attitude and consequent increase in airspeed to be commanded.

Figure 1:
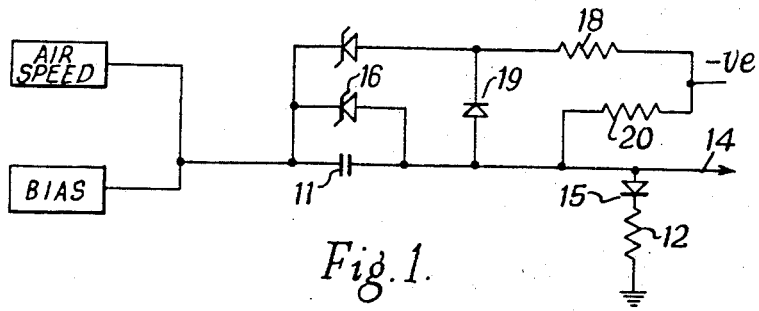
Figure 2:
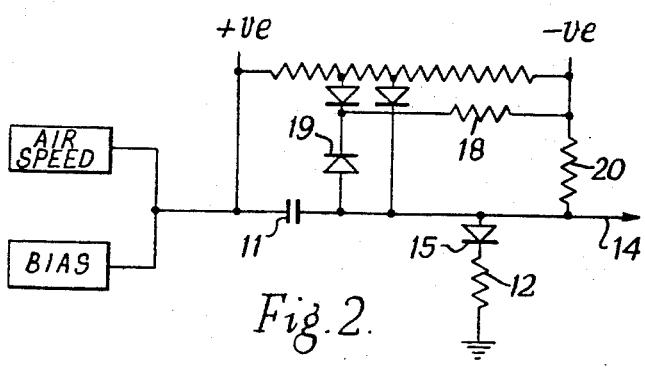
Figure 3:
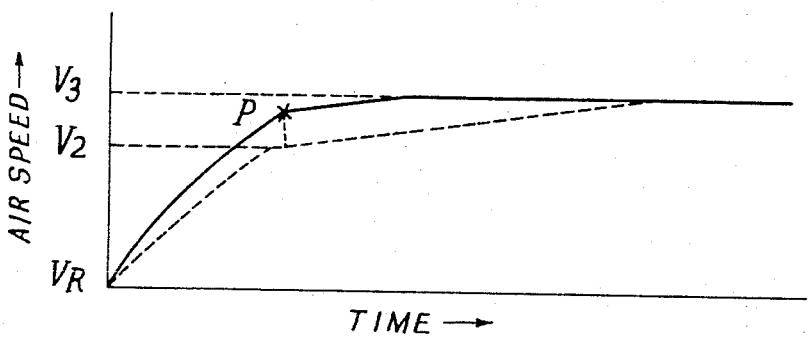

Two embodiments of the invention are now described with reference to the accompanying drawings, in which:

FIGURE 1 is a diagram showing a circuit for inclusion in a flight director comprising a first embodiment, FIGURE 2 is a diagram showing a circuit for inclusion in a flight director comprising the second embodiment, and FIGURE 3 shows speed/time curves of an aircraft operating with either of the two embodiments.

The flight director for which both circuits are intended has an indicator moved relative to an index in response to an electrical attitude command signal. The components of the command signal depend on the particular condition (e.g. climb-out, cruise, glide slope holding, etc.) in which the aircraft is required to operate.

During the ground-run leading up to take-off, the command signal is derived from an airspeed signal produced by a barometric airspeed sensor (not shown) as described in the aforementioned patent, the signal first appearing to command maximum "fly down" but decreasing as the air speed increases. On the aircraft reaching a rotation speed $V_R$ (at which the pitch attitude should be increased to enable the aircraft to become airborne) a trigger circuit (not shown) operates and the command signal normally now applied to the index is derived from acceleration and pitch attitude information and commands "fly up" as described in the aforementioned patent. The pilot, following the command, rotates the aircraft at a rate which is limited to a safe rate by a limit on the command signal. The aircraft then takes off and normally climbs out at an angle and acceleration determined by the available power, the corresponding command signal being derived from an accelerometer and a vertical gyro as described in the aforementioned patent and British application No. 46,515/65. The take-off director, as described in the prior applications in effect determines the climb speed by controlling the acceleration from rotation speed $V_R$. The performance achieved depends upon the accuracy of the accelerometer/vertical gyro combination and the precision with which the pilot is able to follow the command. In marginal power conditions, possible vertical gyro errors become significant (1 degree of error may be ⅓ knot per second deviation from the optimum acceleration with a consequent airspeed variation). Thus a speed sensitive control is desirable in order to contain any speed error under marginal power conditions when small errors become significant and the time in the critical speed region (i.e. in the stall region) becomes protracted.

The two command signal monitoring circuits shown here are such that their outputs can remain connected to a command signal line (not shown) throughout rotation and climb-out, but only become effective to command reduced attitude if the airspeed does not reach certain levels in certain times, if the airspeed drops below a certain level.

The FIGURE 1 circuit has two D.C. input signals, one related to the airspeed and the other a biasing signal. These two input signals are added and then the resulting signal which may for instance represent speed above $V_R$ is applied to a differentiating circuit comprising condenser 11 and resistor 12. As speed increases therefore the positive output on line 14 comprises a measure of the rate of change of the speed signal charging the condenser 11, i.e. acceleration, and this output is added to form part of the acceleration component of the normal fly-up command signal otherwise generated as described in the aforementioned patent.

If however a power failure or other cause brings about a reduction in speed, the differentiating circuit cannot operate due to the presence of diode 15, which prevents the condenser 11 being discharged to earth. The signal on line 14 therefore changes polarity and becomes related to the difference between the maximum charging signal, i.e. the highest speed attained and the actual charging signal, i.e. the speed to which the aircraft has dropped. Since the signal on line 14 has changed polarity, when added to the command signal it causes direction of a reduced climb angle, so tending to recover the lost speed.

Zener diode 16 connected across the condenser 11 limits the charge on the condenser. The diode 16 is chosen so that the maximum retained charge is limited to correspond to an airspeed equal to a predetermined optimum climb-out speed $V_3$. The circuit therefore starts to affect the command signal to direct a speed recovery when the airspeed drops below $V_3$.

In a normal take-off under full power a predetermined take-off safety airspeed $V_2$ is exceeded soon after rotation takes place. If, however, a power reduction or failure occurs, it is regarded as of prime importance for the safety speed $V_2$ to be achieved as soon as possible even at the expense of rate of climb, so as to avoid danger of stalling.

A relatively fast-bleed resistor 18 is connected to a negative supply so that it would effect a fairly rapid negative charging of the condenser 11, when diode 19 allows to a maximum level equivalent to that to which the condenser would be charged in response to an airspeed signal representing $V_2$. Being of negative polarity, this increasing charge would appear on output line 14 and when added to the command signal would cause it to direct a reduced climb angle so as to increase speed.

When $V_2$ has been reached, the next requirement is that the preferred climb-out speed $V_3$ be attained. To this end a slower-bleed resistor 20 connected to the same negative supply would, in the absence of other charging, charge the condenser 11 at a slower rate to a level equivalent to an airspeed $V_3$. The rate at which the condenser would be charged is such that the consequent effect on the command signal would be to direct a slow increase of speed at the minimum rate which is considered safe under marginal power conditions.

FIGURE 3 illustrates in dotted lines the rate of speed change which would be demanded in consequence of the combined effect of the two bleed resistors, if at any time during take-off a substantial power loss occurred. In a normal full power take-off the actual airspeed will at all times exceed the increasing speed which would be demanded by the effect of the bleed resistors, so inhibiting their effect. By way of example, the full line in FIGURE 3 shows the speed/time curve of an aircraft taking off initially under full power, but suffering a power reduction at a point P. Up to a point P, the bleed resistors are ineffective, the airspeed being always sufficient to ensure that the charge on condenser 11 due to the airspeed signal swamps the bleed effect the output signal added to the command signal being a positive representation of the acceleration. The pilot is therefore directed to "fly up" under a director law described in the aforementioned patent. After the failure of power the airspeed exceeds $V_2$ but is less than $V_3$ and the airspeed signal no longer increases at a great enough rate to offset the charging effect of bleed resistor 20. The condenser 11 is thereafter negatively charged through the bleed resistor 20 and the output signal is a negative representation of a demanded speed, slowly increasing from that pertaining at point P to $V_3$ at the said minimum rate. The "fly up" command signal is therefore reduced, and the pilot is directed to reduce the climb angle until he builds up speed to $V_3$. Once $V_3$ is reached the bleed resistors are ineffective, and the output on line 14 only becomes negative should the speed drop below $V_3$ during climb out.

The circuit shown in FIGURE 2 has the same effect as that of FIGURE 1, and has similar elements indicated by the same reference numerals. The Zener diodes are however replaced by diodes biased from fixed potentials. In order to remove the voltage from the output due to the forward voltage on diode 15, a further diode (not shown) may be connected in series between resistance 12 and earth in a reverse direction to that of diode 15, and biased by connection to the negative supply.

In an alternative arrangement (not shown) the slow bleed resistance 20 is arranged to be so slow as just to meet the current drain of the succeeding circuit (which may be a high impedance emitter follower). In these circumstances, after $V_2$ is reached the resistance 20 will not call for increase of speed, and the aircraft will only accelerate if there is sufficient power as directed by the normal director law. However, a very slow gain of speed up to $V_3$ can be demanded if the slow bleed is adjusted to be a little more than the current required by the succeeding circuit.

For use in "cruise" condition, the circuits can also be connected to provide a component of the command signal for "Airspeed hold" at any desired airspeed, by an adjustment to the bias signal added to the airspeed sensor so that the airspeed signal represents error from the desired airspeed.

For use in cases where the airspeed signal is supplied in an alternating form, the circuits of FIGURES 1 and 2 can have added rectifying means (not shown).

What is claimed is:

1. In a flight instrument of the kind including apparatus for producing a command signal related to the aircraft's correct pitch attitude, means for monitoring the command signal during take-off comprising an electrical circuit having an input which has connections to receive an input signal representing measured airspeed of the aircraft and an output line which is connected to correct the command signal, said electrical circuit having a differentiating circuit, means for applying said input airspeed signal to the differentiating circuit, and one-way inhibiting means connected in the differentiating circuit in the sense to prevent differentiation of airspeed signals corresponding to decreasing airspeed.

2. In a flight director of the kind including apparatus for producing a D.C. command signal related to the aircraft's correct pitch attitude, means for monitoring the command signal during take-off comprising a D.C. electrical circuit having an input which has connections to receive a D.C. signal representing measured airspeed of the aircraft and an output line and alegbraic adding means connected between said output line and a line carrying the command signal; said electrical circuit having a condenser, one side of which is connected to receive said airspeed signal, a resistor connected between earth and the other side of the condenser, said other side of the condenser being also connected to the output line, and a diode-connected in series with said resistor in the sense to prevent the resistor from effecting differentiation of negative signals on said other side of the condenser due to decreasing airspeed signals.

3. Monitoring means as claimed in claim 2, wherein said electrical circuit also has a limited source of increasingly negative potential connected to said other side of the condenser, the rate of increase of potential being such that in a normally-powered take-off the positive charge on the condenser due to the increasing airspeed signal is always great enough to overcome said potential.

4. Monitoring means as claimed in claim 2, wherein said electrical circuit also has two sources of increasingly negative potential connected to said other side of the condenser, the sources having different rates of increase and being limited at different maximum levels, the rates of increase both being such that in a normally-powered take-off the positive charge on the condenser due to increasing airspeed signals is always great enough to overcome both potentials.

5. In a flight instrument of the kind including apparatus for producing a D.C. command signal related to the aircraft's correct pitch attitude, means for monitoring the command signal during take-off, comprising a D.C. electrical circuit having an input which has connections to receive a positive D.C. signal representing measured airspeed and an output line, and algebraic adding means connected to said output line and a line carrying the command signal; said electrical circuit having a condenser one side of which is connected to receive said airspeed signal, a resistor connected between earth and the other side of the condenser, said other side of the condenser being also connected to the output line, a diode connected in series with said resistor in the sense to block positive signals, and a limiting diode connected across the condenser to limit the charge thereon.

6. Monitoring means as claimed in claim 5 wherein said limiting diode is a Zener diode.

7. Monitoring means as claimed in claim 5 wherein said limiting diode is biased to block voltages below that corresponding to a preferred climb-out speed.

References Cited

UNITED STATES PATENTS

| | | | |
|---|---|---|---|
| 3,048,329 | 8/1962 | Berggren | 235—150.22 |
| 3,192,503 | 6/1965 | Lang | 73—178 XR |
| 3,313,153 | 4/1967 | Greene | 73—178 |

LOUIS R. PRINCE, *Primary Examiner.*

DONALD O. WOODIEL, *Assistant Examiner.*

U.S. Cl. X.R.

244—77